Patented July 11, 1933

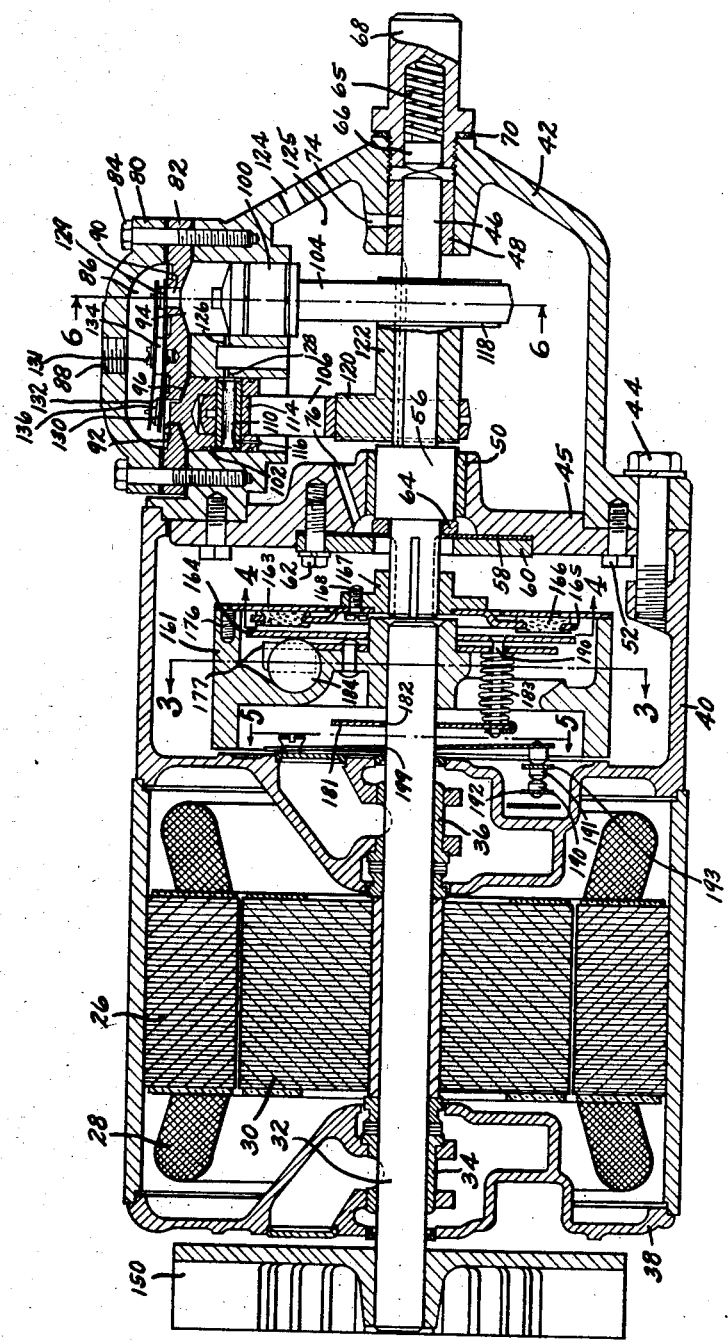

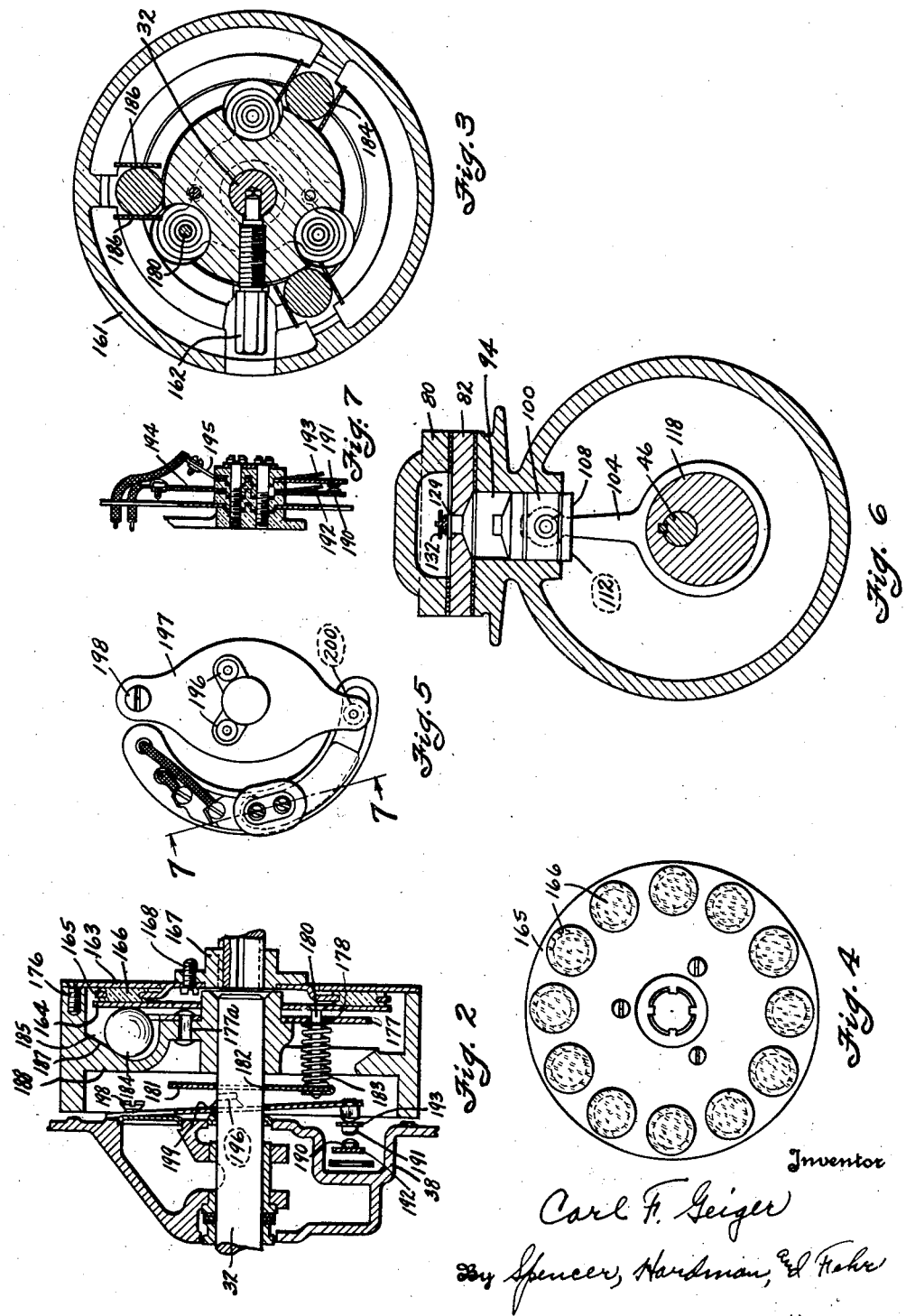

1,917,760

UNITED STATES PATENT OFFICE

CARL F. GEIGER, OF DAYTON, OHIO, ASSIGNOR TO FRIGIDAIRE CORPORATION, OF DAYTON, OHIO, A CORPORATION OF DELAWARE

PUMP FOR REFRIGERATING APPARATUS

Application filed December 31, 1929, Serial No. 417,799. Renewed November 23, 1932.

This invention relates to refrigerating apparatus and more particularly to a compressor and motor unit adapted to be used in refrigerating apparatus.

An object of the invention is to provide an improved centrifugal clutch which connects the armature shaft of the motor to the compressor shaft when a predetermined speed of the motor has been attained and which functions as a flexible coupling for the shafts.

Another object of the invention is to provide a speed responsive switch which will operate in conjunction with the centrifugal clutch referred to.

Further objects and advantages of the present invention will be apparent from the following description, reference being had to the accompanying drawings, wherein a preferred form of the embodiment of the present invention is clearly shown.

In the drawings

Fig. 1 is a longitudinal sectional view of a motor-compressor unit embodying the present invention and comprising a motor, a centrifugal clutch, a centrifugal switch and a compressor.

Fig. 2 is a fragmentary sectional view of the clutch, showing the clutch engaged and the switch open.

Figs. 3, 4, 5, and 6 are sectional views taken on the lines 3—3, 4—4, 5—5 and 6—6 of Fig. 1.

Fig. 7 is a fragmentary sectional view of a switch taken on the line 7—7 of Fig. 5.

The unitary compressor unit comprises a motor, a compressor unit and a connecting unit. The motor may be an induction motor having a stator 26, stator windings 28, and a rotor 30 mounted on the armature shaft 32, journalled in the bearings 34 and 36, mounted on the end frame 38 and the connecting unit housing 40, respectively.

The compressor housing 42 forming the crankcase of the compressor is attached to the opposite end of the housing 40 by screws 44, only one of which is shown. The compressor drive shaft 46 is journalled in bearings 48 and 50, mounted in the housing 42 and in the end frame 45 respectively. The end frame 45 is connected to the housing 42 by screws 52, only one of which is shown. A gasket 64 is intermediate the collar 56 integral with the shaft 46 and a plate 58 held in position by a collar 60 attached to the end frame 45 by screws 62.

The drive shaft 46 is biased to the left, as shown in Fig. 1, by a helical spring 65 cooperating with a plunger 66 mounted in a recess in a plug 68 threadedly engaging housing 42. Intermediate the housing 42 and the plug 68 is mounted a gasket 70. It may readily be seen that the refrigerant and oil will be prevented from escaping from the compressor chamber on the left end of the compressor by the gasket washer 64, which is compressed by members 66 and 72. Oil may be supplied to the bearings 48 and 50 through the holes 74 and 76.

The compressor housing 42 is formed to provide at its upper end two cylinders 94 and 96 in which reciprocate the pistons 100 and 102 secured to the pitmen 104 and 106 by the wrist pins 108 and 110 journalled in bearings 112 and 114 which are secured in place by the pins 116 only one of which is shown. The connecting rods or pitmen 104, 106 are mounted on the eccentrics 118 and 120 integral with the tubular member 122, keyed to the drive shaft 46 of the compressor to rotate therewith. A valve plate 82 and the head plate 80 cooperate to form the outlet chamber 86 therebetween and both members are secured to the top of the housing 42 by the bolts 84. The plate 82 is provided with passages 90 and 92 leading from the cylinders 94 and 96 to the outlet chamber 86, and these passages are normally closed by the compressor outlet valves 129 and 130 biased to closed position by the leaf spring 132 held in position by the screw 131 and spaced from the support by the spacer 134 and from the valves by spacers 136. The outlet chamber 86 is adapted to be connected to a condenser (not shown) at the outlet 88, while the crankcase is adapted to be connected to the outlet of the evaporator at the inlet 124. The cylinders 94 and 96 are fed with gaseous refrigerant on the suction stroke of the pumps through the passages 126, 128 connecting with the crankcase.

In operation of the compressor, refrigerant gas is drawn in from the evaporator through the opening 124 into the crankcase of the compressor. From the crankcase, the gaseous refrigerant is drawn through the passages 126 into the cylinders 94 and 96 alternately. Rotation of the drive shaft 46 causes pistons 100 and 102 to reciprocate, compressing the gaseous refrigerant on the up stroke. The compressed gas will lift the valve reed 129 off its seat against the tension of the spring 132, and the compressed gas will discharge into the outlet chamber 86 from where it will flow to a condenser, (not shown) but which should be near the fan 150 to be cooled thereby.

The shaft 46 is driven by the motor and is connected thereto by a unitary power transmitting structure coupling which is attached to the driving shaft 32 and comprises a flywheel 161 attached by a set screw 162, see Fig. 3, to the shaft 32, a driving clutch plate 163, a floating driving clutch plate 164, a driven clutch plate 165 carrying friction inserts 166 and a driven collar 167 to which the plate 165 is attached by screws 168. The collar 167 is splined on the shaft 46. The plate 163 is attached by screws 176 to the flywheel 161. The driving disk 164 is supported for rotary and axial movement by the flywheel 161. To accomplish this, a plate 177 is attached to the flywheel 161 by rivets 177a and is provided with apertures 178 which provides a guide bearing for a stud 180 attached at one end to the plate 164. There are three studs 180 which support the plate 164 for endwise movement. The studs 180 are each attached at their other ends to a plate 181 having a central aperture 182 for receiving the shaft 32. Springs 183, each surrounding a stud 180 and confined in initial state of compression by the plate 181 and the plate 177, yieldingly urge plate 164 away from the plate 163 in order that the driven plate 165 will be normally disconnected from the driving plates 163 and 164. The speed responsive means for moving the plate 164 toward the plate 163 in opposition to the action of the springs 183 includes a plurality of balls 184, each of which is guided for radial movement by the walls of the pockets 185, each pocket 185 is defined by a portion of the plate 164, by a pair of parallel ears 186 integral with the plate 177 and by a surface 187 provided by a web 188 of the flywheel 161, said surface 187 being oblique to the plane of the plate 164. It is, therefore, apparent that as the speed of the shaft 32 increases, the balls 184 will move radially outward and in an oblique path due to engagement with oblique surface 187. Therefore, the plate 164 will be moved toward the right in the drawings and will be wedged against the friction inserts 166 of the plate 165 and will cause them to be frictionally engaged, also the plate 163, as shown in Fig. 2. Thus, above a certain predetermined speed of the shaft 32, the shaft 32 will be connected with the collar 167 through the friction clutch provided between plates 163 and 164, and inserts 166. As the speed of the shaft decreases, the springs 183 will be increasingly effective to move the plate 164 out of frictional engagement with the inserts 166, and then cause the plate to force the balls 184 against the oblique surfaces 187, so that the balls will finally be returned to the normal position shown in Fig. 1. Thus, the frictional clutch will be disengaged below a certain speed of the shaft 32. There is clearance between the collar 167 and the hub of the flywheel 161, so that the inserts 166 may move endwise away from the plate 163.

The centrifugal means for controlling the clutch operates also to control an electric circuit for an electric motor which drives the shaft 32. The induction motor is provided with a starter circuit which is maintained normally closed by a pair of switch contacts 190 and 191, carried by leaf spring conductors 192 and 193 respectively, connected with terminal plates 194 and 195 respectively. These parts are insulatingly supported by the motor end frame 38 with the parts 192 and 194 in engagement and parts 193 and 195 in engagement as shown in Figs. 5 and 7. The leaf spring 193 is normally biased so as to maintain the contact 191 separated from the contact 190. When the motor is at rest, the contact 191 is held in engagement with the contact 190 due to the action of the spring 183 which pressed the plate 181 against projections 196, extending from the plate 197, which is pivoted upon the screw 198 so as to swing laterally relative to the motor end frame 38. The plate 197 is provided with a central hole 199 for receiving the shaft 32, the shaft preventing the plate 197 from rotating about the screw 198. The free end of the plate 197 engages a stud 200, which bears against spring conductors 193 and maintains the contact 191 in engagement with the contact 190. When the balls 184 move outwardly to engage the clutch members, the plate 181 is moved to the right from the position shown in Fig. 1 to that shown in Fig. 2, in order to permit the plate 197 to swing away from the motor frame 38 and to permit the spring conductor 193 to separate the contact 191 from the contact 190.

It may be readily seen that the compressor unit may be readily disassembled by removing the screws 44 which permits the separation of the compressor per se from the motor and the coupling as the shaft 46 slips out of the collar 167 which is normally splined thereto. The clutch is then readily accessible for repairs or for the replacement of worn parts.

The combination of the motor and the compressor into a single unit saves space and eliminates complicated driving means in that, in this unit the centrifugal clutch has its driving member connected to the armature shaft and its driven member splined on the compressor shaft. In case the two shafts are not perfectly aligned due to uneven tightening of the bolts 44 or to any other causes whatsoever, the clutch plate will also function as a flexible coupling. This is accomplished by reason of the fact that the plates 164, 163 and 165 are slightly flexible and consequently any slight irregularity in the aligning of the shafts will cause the plates to flex slightly to conform to the irregularity.

While the form of embodiment of the present invention as herein disclosed, constitutes a preferred form, it is to be understood that other forms might be adopted, all coming within the scope of the claims which follow.

What is claimed is as follows:

1. A motor-compressor unit comprising a motor having a shaft, a starting winding and a running winding for said motor, a compressor having a drive shaft in substantial alignment with said motor shaft, a clutch for operatively connecting said shafts, and means associated with said clutch for disconnecting said starting winding when the speed of the motor attains a predetermined high value, and means compensating for any slight irregularity in the alignment of said shafts.

2. A motor-compressor unit comprising a motor having a shaft, a compressor having a drive shaft in substantial alignment with said motor shaft, a clutch for operatively connecting said shafts, said clutch including end plates connected with the motor shaft, one of said plates being movable axially, an intermediate plate located between the end plates and connected with the compressor shaft, said end and intermediate plates compensating for any slight irregularity in the alignment of said shafts.

3. A combined centrifugal clutch and switch comprising coaxially rotating and driven members, clutch end plates connected with the driving member, one of them being axially movable, an intermediate plate located between the end plates and connected with the driven member, a switch controller movable axially with respect to the driving member and connected to the axially movable driving plate, and speed responsive means operated by the driving member for causing the axially movable plate to operate the controller and to bear against the intermediate plate.

4. A motor compressor unit comprising a motor having a shaft, a compressor having a drive shaft in substantial alignment with said motor shaft, a clutch for operatively connecting said shafts, said clutch including end plates connected with one of said shafts, one of said plates being movable axially, an intermediate plate located between the end plates, and connected with the other of said shafts, said end and intermediate plates compensating for any slight irregularity in the alignment of said shafts.

In testimony whereof I hereto affix my signature.

CARL F. GEIGER.